Dec. 29, 1936.  A. PEARSON  2,065,733
MOSS RAKE FOR CANALS
Filed Jan. 13, 1934   2 Sheets-Sheet 2
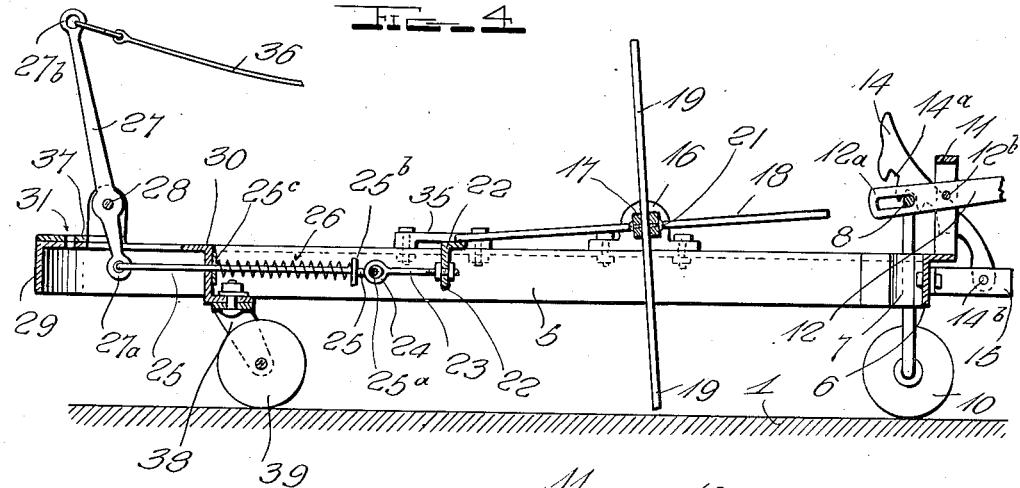
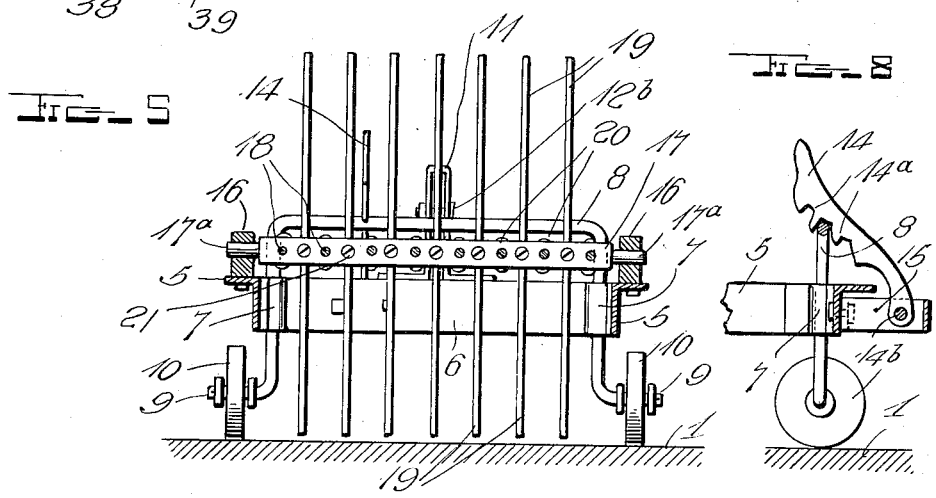
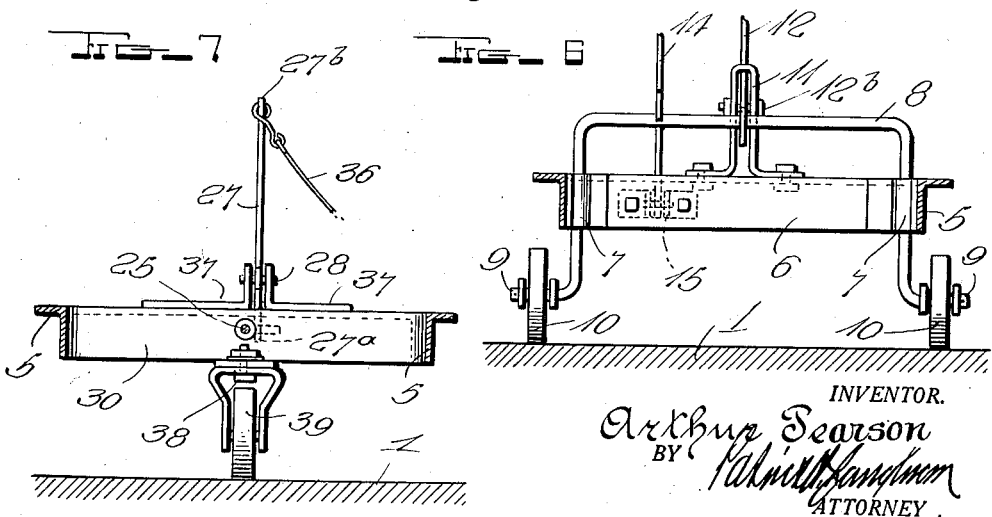
INVENTOR.
Arthur Pearson Patented Dec. 29, 1936

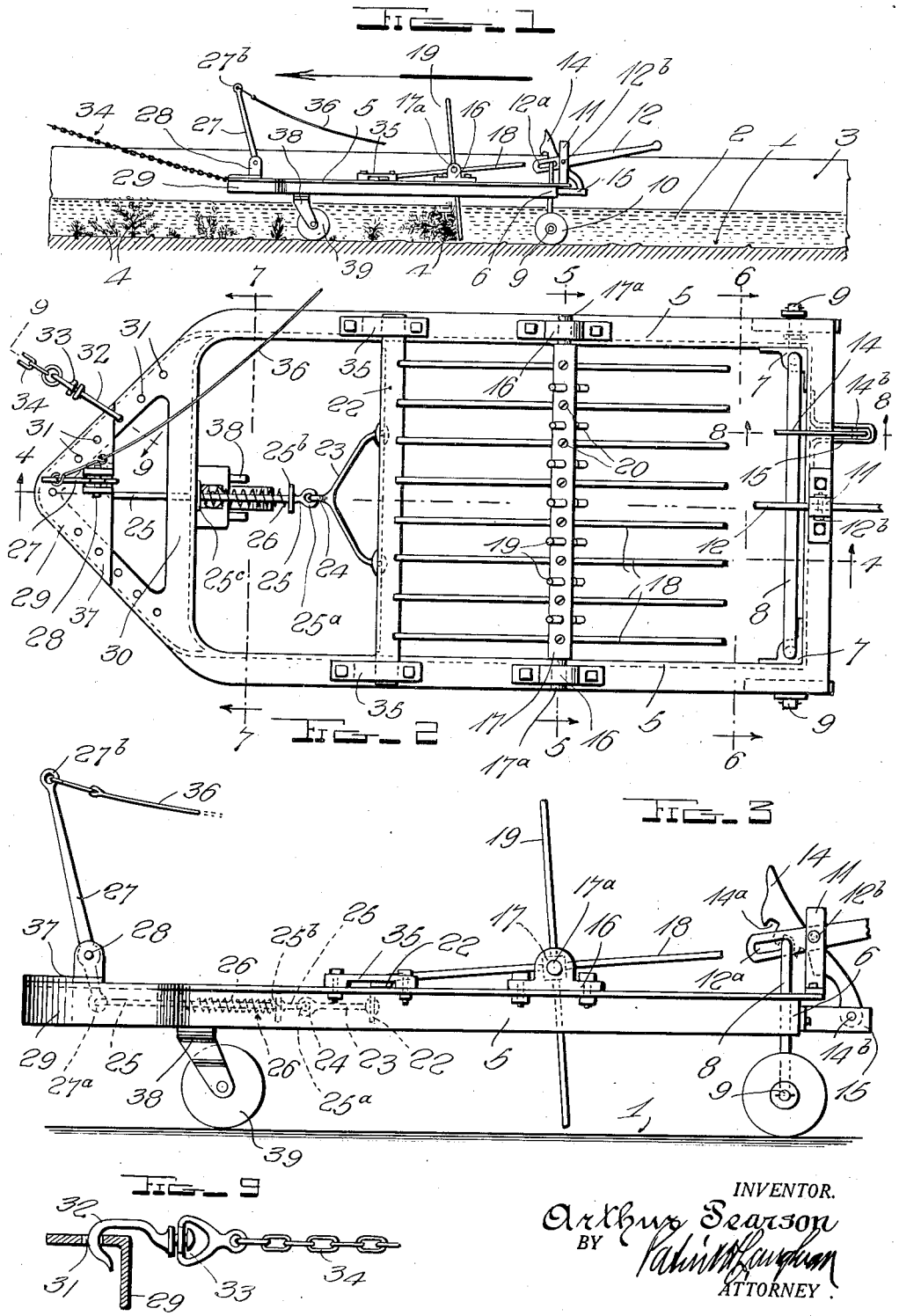

2,065,733

UNITED STATES PATENT OFFICE 2,065,733

MOSS RAKE FOR CANALS

Arthur Pearson, Burley, Idaho

Application January 13, 1934, Serial No. 706,545

9 Claims. (Cl. 56—8)

My invention relates broadly to canal dredging apparatus and more particularly to an apparatus for removing accumulation of moss, vegetation and marine growths which tend to obstruct the movement of boats through canals.

One of the objects of my invention is to provide an improved construction of moss rake machine which may be readily operated in a canal for removing moss or other vegetation and marine growth from the canal for restoring the normal flow of water through the canal and rendering the canal useful for canal boat traffic.

Another object of my invention is to provide a simplified construction of moss rake machine having a three point traction support readily operative in a canal with means for adjusting the position of the frame structure with respect to the bed of the canal for correspondingly controlling the operation of a rake device with respect to the bed of the canal.

Still another object of my invention is to provide a moss rake machine for canals having a rotatable rake rotatably supported in a frame structure having means for controlling the movement of the rake for periodically releasing accumulation gathered by the rake.

A further object of my invention is to provide a construction of frame for moss rake machines having traction means operative along the bed of the canal, including a swivel wheel adjacent the front of the machine arranged to permit the machine, at any time and in any position, to be drawn out upon the bank of the canal for avoiding possible low bridges or other obstructions, at the same time facilitating the complete reversal of the machine in a canal.

Still another object of my invention is to provide a moss rake having a frame structure supported on traction means operative along the bed of a canal in which the frame structure carries a multiplicity of operating means, one of the operating means controlling the elevation of the frame structure with respect to the bed of the canal and another of the operating means providing a lock for an angularly shiftable rake member for permitting the rake to be moved into different angular positions for clearing the rake teeth and periodically dumping the accumulated matter.

Other and further objects of my invention reside in the construction of the moss rake machine as set forth more fully in the specification hereinafter following by reference to the accompanying drawings, in which:

Figure 1 is a side elevation of a moss rake showing the same as when in use, for removing an accumulation of undesirable eel grass, marine growth, and foreign matter, tending to retard the normal flow of water, from the bottom of a canal or irrigation ditch; Fig. 2 is a top plan view thereof on an enlarged scale; Fig. 3 is a side elevation thereof; Fig. 4 is a central vertical longitudinal section taken substantially on line 4—4 of Fig. 2; Fig. 5 is a transverse vertical section taken on line 5—5 of Fig. 2 looking in the direction of the arrows; Fig. 6 is a transverse vertical sectional view taken on line 6—6 of Fig. 2 looking in the direction of the arrows; Fig. 7 is a transverse vertical sectional view taken on line 7—7 of Fig. 2, looking in the direction of the arrows; Fig. 8 is a fragmentary sectional view taken on line 8—8 of Fig. 2; and Fig. 9 is a detailed sectional view taken on line 9—9 of Fig. 2, showing more particularly the detachable chain and clevis used for pulling the moss raking machine along the bottom of a canal.

The apparatus of my invention has been found extremely useful in reclamation service for clearing canals of tree and frog moss that at times effectually chokes the flow of water in the canal. The moss rake machine of my invention comprises a substantially rectangular frame supported upon traction means operative along the bed of a canal. The traction means adjacent the front of the frame comprises a swivel mounting for a wheel structure. The traction means adjacent the rear of the frame comprises rotatable wheel members journaled on stub shafts which are interconnected by an axle member which extends vertically and embraces substantially the width of the frame structure for clearing vegetation, moss and marine growth in the bed of the canal. That is to say, the rear axle does not extend horizontally between the rear wheels of the frame structure and thus form an obstruction adjacent the bed of the canal, but on the contrary is substantially elevated from the bed of the canal between the rear wheels. The front of the frame structure is tapered and is provided with attachment means engageable at any selected interval along the front of the frame structure to enable a chain to be connected with the frame structure and extended to a tractor or horse team operative along the towpath on the bank or banks of the canal. The machine may thus be propelled by a tractor or a horse team, according to the size of the moss rake. I have used from one to as many as twelve horses in a team to pull moss rakes of the construction set forth herein, of different sizes. The operation of the machine is directed from the bank or banks of the canal, neither the driver nor horses having to enter the water.

In lieu of the angular shiftable attachment means at the front of the frame structure, I may apply the propelling force directly to the center of the front of the frame structure and provide an evener which receives the full pull from the front. Chains from each end of the evener, as long as required to reach the bank, can at any time be shortened or lengthened so as to throw the moss rake machine into any position desired. The other ends of the chains are connected with single or double-trees to which the horses on the bank or banks are hooked, or to which the tractor may be connected. If the width of the canal is such as to make a return trip necessary, to clear the opposite bank or half of the bed of the canal, the chains opposite such bank can be shortened to insure the movement of the moss rake in the proper direction.

The frame of the moss rake includes a support at one end thereof for the elevated axle of the machine. A lever member coacting with the elevated axle is pivoted on the frame of the moss rake, which lever member engages the axle for raising or lowering the frame of the moss rake with respect to the rear supporting wheels for correspondingly adjusting the position of the moss rake carried by the frame structure with respect to the bed of the canal. The frame of the moss rake also carries locking means adapted to maintain the frame structure in a selected elevated position. At the front of the machine I provide a lever member connected to a horizontally arranged actuating rod which is normally spring pressed to maintain a horizontally disposed locking bar in a position obstructing the movement of the moss rake. The locking bar has the opposite ends thereof operating in slotted guides carried by opposite sides of the frame of the moss rake. The moss rake comprises a multiplicity of diametrically extending teeth supported by a central bar which is pivoted at opposite ends in journals carried by opposite sides of the frame structure. The rake teeth comprise alternately disposed rod members which extend in planes normal to each other. The right angular disposition of the rake teeth provides quadrantal areas in which moss, vegetation and marine growth is accumulated as the moss rake is drawn through the canal, the rake being locked to prevent rotation thereof by engagement of the locking bar with the extremities of the teeth at right angles to the teeth which are functioning as rakes for any given quadrantal adjustment of the rake. When the rake has gathered a quantity of moss, vegetation or marine growth, the lever which controls the locking bar is tripped, releasing the rake and allowing one quadrantal movement thereof. This serves to dump the gathered material from the rake teeth which floats down the canal to the nearest gate where it can be easily withdrawn by a simple moss fork. The cleared teeth are successively brought into position as the raking operation continues. The tripping operation for effecting quadrantal movement of the rake, is controlled wholly from the bank of the canal through a trip cord leading to the attendant on the bank of the canal.

Referring to the drawings in detail, reference character 1 designates the bed of a canal through which the body of water 2 flows, confined by bank 3. The vegetation, moss and marine growth has been designated generally at 4. The frame of the moss rake is shown at 5 comprising two parallel extending side portions, an end portion 6 and a front apex portion shown generally at 29, reinforced by lateral member 30. The apex portion 29 is provided with a plurality of spaced apertures 31 therein through which the connecting hook 32 may be engaged. Connecting hook 32 is connected through swivel 33 with chain 34 which leads to the tractor or team of horses on the bank or banks of the canal. The frame structure 5 has sleeve members 7 mounted in the rear corner thereof through which parallel vertically extending portions of the axle 8 extend. The frame 5 is vertically adjustable along the vertically extending portions of the axle 8 for raising or lowering the frame structure with respect to the bed of the canal. The axle 8 has the vertically extending parallel portions thereof turned at right angles to provide stub shafts 9 which carry the wheels 10, providing the rear supports for the frame structure. The laterally extending rear frame member 6 of the frame structure carries a support 11 through which hand lever 12 is pivotally mounted as indicated at 12b. The hand lever 12 is slotted as at 12a and embraces the horizontally extending portion of the axle 8. By angularly shifting hand lever 12 in a vertical plane, the frame structure 5 may be raised or lowered with respect to the bed of the canal illustrated at 1 by varying the projection of the wheels 10 beneath the frame structure 5. At any selected elevation the axle 8 may be locked with respect to the frame structure 5 by means of ratchet lever 14. The ratchet lever 14 is pivotally mounted at 14b in a projecting member 15 connected with the laterally extending member 6 at the rear of the frame structure. Ratchet teeth 14a are provided on ratchet member 14 for engaging the horizontally extending portion of axle 8 in any selected position for maintaining the frame structure at a desired elevation with respect to the bed of the canal.

At a position intermediate the opposite ends of the frame structure and more nearly adjacent the rear end of the frame structure, I mount a pair of aligned journals on the opposite side bars constituting the frame structure. The bearings 16 provide means for receiving and mounting the laterally extending shaft 17. The shaft 17 has the end portions 17a thereof journaled in the bearings 16. Shaft 17 provides a mounting means for a multiplicity of rake teeth. There are two sets of rake teeth extending in planes normal to each other. The rake teeth are formed by sets of rod members which extend through the shaft 17. The rod members constituting one set of rake teeth are alternately disposed with respect to the rod members constituting the other set of rake teeth. The rod members are removably secured in position in shaft 17 by set screws shown at 20 and 21. The set screws 20 and 21 pass radially through the shaft 17 on opposite sides of the rod members and serve to centrally grip the rod members. When it is desired to renew the rod members constituting the rake teeth this can be readily done by loosening the set screws, withdrawing the defective rod member and inserting a renewal rod member. The rectangular section of the shaft 17 facilitates the mounting of the two sets of rod members which extend in planes disposed at right angles to each other. The set screws illustrated at 20 engage and grip the rod members constituting the sets of rake teeth shown at 18. The set screws 21 engage and grip the rake teeth constituted by rod members 19, which rod members are maintained in rigid position in planes extending normal to each other. In order to provide a rigid abutment for the rake device so that the rake teeth projecting beneath the frame structure will effectually clear the canal, I arrange the laterally extending abutment bar 22 which projects over the opposite sides 5 of the frame structure. The abutment bar 22 is confined in a path of limited horizontal movement by means of guides 35 carried by opposite sides 5 and embracing the ends of the abutment bar 22. A yoke 23 is connected with the abutment bar 22 and terminates in an eyelet 24 which is engaged by an eyelet 25a on the end of the reciprocatory rod 25. The reciprocatory rod 25 extends along the central axis of the frame structure and passes through ring member 25c which abuts with the laterally extending member 30 through which rod member 25 also extends. The rod member 25 carries an annular abutment 25b thereon. Between the abutment 25b and the ring member 25c the coil spring 26 is arranged, which spring normally tends to force abutment bar 22 toward the limits of the guides 35 in the direction of the rear of the frame structure and in a path obstructing the rotation of the rake device. That is to say, the extremities of the rake teeth abut against the obstruction bar 22 and maintain the lower projecting rake teeth in a rigid position for accumulating moss, vegetation and marine growth as the moss rake is drawn through the canal. When a quantity of matter has been accumulated and it is desired to release such moss, vegetable matter, or marine growth, the trip cord 36 which is connected to the extremity 27b of lever 27 is given a quick jerk. Lever 27 moves angularly about pivot 28 mounted on the plate 37 in the apex portion 29 at the front of the frame structure. The end 27a of lever 27 moves forward and pulls rod 25 against the action of coil spring 26. Rod 25 operates to move yoke 23 forward, which in turn moves obstruction bar 22 forward, thus releasing the accumulated matter collected by one quadrantal area of the moss rake, which matter is allowed to float with the current of the canal to be gathered and withdrawn by means of a simple moss fork at the nearest gate or lock. Due to the fact that the trip cord 36 is immediately released spring 26 operates to shift the obstruction bar 22 back into position, thereby catching the moss rake in its next quadrantal movement ready to effect the next accumulation of moss, vegetation and marine growth. The trip cord 36 is operated by the attendant from the bank or banks of the canal at desired intervals when the attendant observes sufficient accumulation of material beneath the moss rake.

By adjusting the position of the frame structure with respect to the bed of the canal, the moss rake may be made effective to the desired depth with respect to the bed of the canal.

The front of the frame structure is supported by a single traction device mounted in yoke member 38 swiveled to the frame structure. Yoke member 38 carries traction wheel 39 which rolls along the bed of the canal and facilitates the guiding of the moss rake in any desired direction.

I prefer to construct the moss rake of my invention from angle iron with any desired proportion with respect to width, depth and length. I have found that the apparatus of my invention meets every emergency and performs work in a period of 30 minutes that would otherwise take several men hours or perhaps a day to accomplish. The saving in labor by use of the machine of my invention is very substantial and the work which is performed is more thorough than can be accomplished manually, without the inconvenience and danger to which men attempting to cut away the moss, vegetable matter, and marine growth, are otherwise subjected.

While I have described my invention in one of its preferred embodiments, I desire that it be understood that modifications may be made and that no limitations upon my invention are intended other than are imposed by the scope of the appended claims.

What I claim as new and desire to secure by Letters Patent of the United States is as follows:

1. A device for raking the beds of irrigation canals which comprises a frame structure, a swivel wheel support for one end of said frame structure, a two wheel support for the opposite end of said frame structure, an axle for mounting the wheels of said two wheel support, said axle including portions extending vertically with respect to opposite sides of said frame structure, said portions being interconnected by a laterally extending portion, an adjusting lever carried by said frame structure and operative by engaging the laterally extending portion of said axle to adjust the position of said frame structure with respect to the traction surface, a rotatable rake pivotally mounted between opposite side portions of said frame structure, and means mounted on said frame structure and engageable with the tines of said rake for maintaining said rake in a selected position effective for accumulating material from said traction surface as said frame structure is moved along the traction surface, said means being operative for releasing said rake and allowing the accumulated material to be discharged, the elements of said device being disposed to provide an unobstructed path for the discharged material.

2. In an apparatus adapted to remove moss, vegetation, and marine growth from canals, a frame structure, a wheeled support therefor, means connected with said frame structure and operative from a bank of the canal for drawing said frame structure on and along the bed of said canal, a rotatable rake journaled laterally of said frame structure, latching means mounted on said frame structure and engageable with the tines of said rake and operable from a bank of the canal for controlling the position of the tines of said rake, means disposed between said frame structure and said wheeled support for controlling the position of said rake with respect to the bed of the canal.

3. A device for raking the beds of irrigation canals which comprises a frame structure, a three wheel support for said frame structure operative on and along the bed of said canal, extensible means connected with said frame structure for controlling the movement of said frame structure from a bank of said canal, a rotatable rake pivotally mounted on said frame structure, one wheel of said three wheel support being a lead wheel for said frame structure, means associated with the rear two wheels of said three wheel support for selectively fixing the clearance of said rake above the canal bed on which said three wheel support operates, means mounted on said frame structure and engageable with the tines of said rake for maintaining said rake in a selected position effective for accumulating material from said canal bed as said frame structure is moved along said canal, lever means pivoted on said frame structure and connected with the last said means and operable for releasing said rake for clearing said rake of accumulated material, and extensible means connected with said lever means for controlling said lever means from a bank of the canal.

4. An apparatus adapted to remove moss, vegetation, and marine growth from waterways, comprising a frame structure, a swivel wheel for supporting the front of said frame structure and operative on and along the waterway, a substantially U-shaped adjustable two wheel support having a pair of vertically disposed members and a laterally extending portion, said support being vertically mounted at the rear of said frame structure, the laterally extending portion of said support substantially clearing the area of the waterway beneath said frame structure, a rotatable rake journaled in opposite sides of said frame structure, and means mounted on said frame structure forward of said rake and engageable with the tines of said rake for maintaining the rake in a rigid position effective to accumulate moss, vegetation, and marine growth from the waterway, said means being operative for releasing said rake.

5. In an apparatus adapted to remove moss, vegetation, and marine growth from waterways, a frame structure, a wheeled support for said frame structure, means connected with said frame structure for drawing said frame structure on and along the bed of said waterway from a path on a bank of the waterway, a multi-section rotatable rake supported by said frame structure and projecting into the waterway, spring pressed means mounted on said frame structure and engaging the tines in a section of said rake for maintaining said rake in rigid position, one section of said rake being effective to accumulate moss, vegetation, and marine growth from the waterway, and lever means pivoted on said frame structure and connected with said spring pressed means and operable for releasing said rake, allowing said rake to rotatably shift in position and release the accumulated mass therefrom and allowing another section of the rake to be moved into effective position preparatory for a succeeding accumulation of moss, vegetation, and marine growth from the waterway.

6. In an apparatus adapted to remove moss, vegetation, and marine growth from canals, a frame structure, a wheeled support for said frame structure operative on and along the bed of the canal, control means connected with said frame structure and operable from the bank of the canal, a rotatable rake structure carried by said frame structure, said rake structure comprising separate sets of teeth disposed in planes normal to each other, the set of teeth in one plane vertically disposed with respect to said frame structure, an obstruction bar slidably mounted on said frame structure and engaging the forward extremities of the set of teeth in the normal horizontal plane for maintaining said first mentioned set of teeth in rigid position effective for accumulating moss, vegetation, and marine growth from the canal as said frame structure is moved through the canal, and lever means pivoted on said frame structure and connected with said obstruction bar and operable from the bank of the canal for shifting said obstruction bar for releasing said rake and allowing quadrantal movement thereof for freeing the accumulated mass of moss, vegetation and marine growth from said first mentioned set of teeth and allowing the teeth formerly in the horizontal plane to be moved into accumulating position.

7. An apparatus adapted to remove moss, vegetation, and marine growth from canals, comprising a frame structure, a wheeled support for said frame structure operative on and along the bed of the canal, control means connected with said frame structure and operable from the bank of the canal, a rotatable rake structure carried by said frame structure, said rake structure comprising separate sets of teeth disposed in planes normal to each other, one set of teeth in one plane projecting beneath said frame structure, an obstruction bar slidably mounted on said frame structure forward of said rake and engaging the extremities of one set of teeth in the other plane for maintaining said first mentioned set of teeth in rigid position effective for accumulating moss, vegetation, and marine growth from the canal as said frame structure is moved through the canal, lever means pivoted on said frame structure and connected with said obstruction bar and operable for shifting said obstruction bar for releasing said rake and allowing quadrantal movement thereof for freeing the accumulated mass of moss, vegetation, and marine growth from said first mentioned set of teeth and allowing a set of teeth in the other plane to be moved into accumulating position, and means disposed between said frame structure and said wheeled support for adjusting the distance of said frame structure above said wheeled support for controlling the distance between the extremities of the rake teeth and the bed of the canal.

8. In an apparatus adapted to remove moss, vegetation, and marine growth from canals, a frame structure, a wheeled support for said frame structure operative on and along the bed of the canal, control means connected with said frame structure and operable from the bank of the canal, a rotatable rake structure carried by said frame structure, said rake structure comprising separate sets of teeth disposed in planes normal to each other, teeth in one plane projecting beneath said frame structure, an obstruction bar slidably mounted on said frame structure and engaging the extremities of teeth in the other plane for maintaining said first mentioned set of teeth in rigid position effective for accumulating moss, vegetation, and marine growth from the canal as said frame structure is moved through the canal, lever means pivoted on said frame structure and connected with said obstruction bar and operable for shifting said obstruction bar for releasing said rake and allowing quadrantal movement thereof for freeing the accumulated mass of moss, vegetation, and marine growth from said first mentioned teeth and allowing said teeth in the other plane to be moved into accumulating position, means mounted on said frame structure and engaging a portion of said wheeled support for adjusting the distance of said frame structure above said wheeled support for controlling the effective depth of the rake teeth with respect to the bed of the canal, and means comprising notches in said last mentioned means for locking said frame structure in said adjusted position with respect to said wheeled support.

9. In an apparatus adapted to remove moss, vegetation, and marine growth from canals, a wheeled frame structure, means connected with said frame structure and operative from the banks of a canal for drawing said frame structure on and along the bed of said canal, a rake including a rotatable shaft journaled laterally of said frame structure, said rake comprising two sets of rod members extending in planes normal to each other, the rod members in one plane alternating in position along said shaft with respect to the rod members in the other plane, screw means set in said shaft for removably securing said rod members in position in said shaft, latching means mounted on said frame structure and engageable in turn with the extremities of said rod members for maintaining said rake in rigid position effective to accumulate moss, vegetation, and marine growth as said frame structure is drawn through the canal, and lever means pivoted on said frame structure and connected with said latching means and operable from a bank of the canal for releasing said latching means, said releasing means effecting disposal of an accumulated mass and allowing the adjacent set of teeth to be brought into accumulative position.

ARTHUR PEARSON.